UNITED STATES PATENT OFFICE.

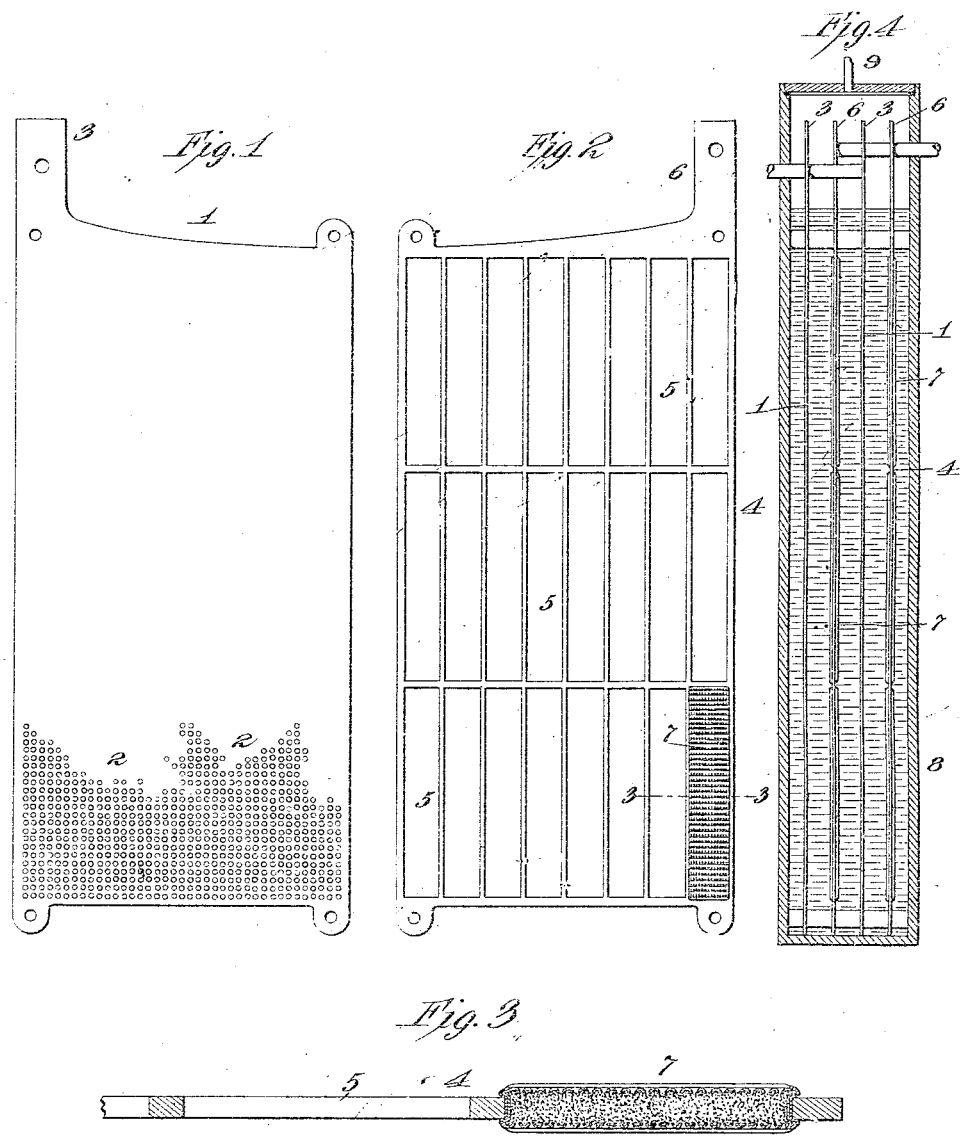

THOMAS A. EDISON, OF LLEWELLYN PARK, NEW JERSEY.

REVERSIBLE GALVANIC BATTERY.

SPECIFICATION forming part of Letters Patent No. 684,205, dated October 8, 1901.

Application filed June 20, 1901. Serial No. 65,286. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Reversible Galvanic Batteries, (Case No. 1,062,) of which the following is a description.

My invention relates to improvements in reversible galvanic cells or so-called "storage batteries," and the invention relates particularly to batteries of the type employing zinc as the active material in an alkaline solution. In my application for Letters Patent filed October 31, 1900, Serial No. 34,995, I describe a battery of this type wherein is employed an electrode of metallic magnesium onto which the zinc is plated from the solution during the charging operation. I found that by employing an electrode of this metal the resulting plating of zinc was very dense and adherent, even with a large volume of current, and that the necessity of employing mercury was completely done away with.

The object of my present invention is to provide a reversible galvanic cell of the type indicated which shall be highly permanent and, as compared with other cells of the same kind, of great capacity per unit of weight.

To this end the invention consists of a reversible galvanic cell employing an alkaline zincate solution, an electrode of metallic magnesium upon which the zinc is deposited during the charging operation, and a second electrode carrying as the depolarizing material an electrolytically-active oxid of nickel or cobalt, preferably intimately mixed with a flake-like inert conducting material, such as flake graphite. Cobalt is not considered as desirable for use as nickel owing to its greater cost and to the fact that it is slightly soluble in an alkaline electrolyte.

The electrode for supporting the depolarizing material is made, preferably, of sheet steel carefully nickel-plated, so as to be unattacked by the alkaline solution, and provided with pockets or receptacles having perforated walls and within which the depolarizing material is maintained under pressure, so as to be at all times in good electrical contact with such walls, said pockets or receptacles being made of very thin nickel-plated sheet-steel high in carbon, so as to be sufficiently elastic to accommodate changes in bulk of the active material.

In order that my invention may be better understood, attention is directed to the accompanying drawings, forming part of this specification, and in which—

Figure 1 is a plan view of one of the magnesium supports on which the zinc is plated during the charging operation; Fig. 2, a similar view of the support for the depolarizing material; Fig. 3, a section on the line 3 3 of Fig. 2 on an enlarged scale, and Fig. 4 a vertical section through a cell formed of four elements.

In all of the above views corresponding parts are represented by the same numerals of reference.

1 represents the magnesium supports in the form of thin plates having numerous perforations 2 therein and with the usual lugs 3 at the top, by means of which the plates may be assembled and electrically connected together. I find that by employing magnesium plates containing numerous perforations the zinc deposit is more adherent, while at the same time the deposit is more evenly distributed over the entire surface than if the plates are imperforate, in which latter case a very much greater deposit takes place at the edges thereof than at other points.

The electrodes for the depolarizing material are made, preferably, as I describe and claim in my application for Letters Patent filed March 5, 1901, Serial No. 49,935, and as I show in Figs. 2 and 3 of the drawings. Each is formed of a plate 4, made of sheet-steel carefully nickel-plated and having rectangular openings 5 5 therein. Each of these plates is provided with a lug or ear 6, opposite the conducting-lug on the alternate magnesium plates 1. Into the openings 5 are secured pockets or receptacles 7, formed of two parts, as shown, held in place and together by a crimping pressure after the active material has been introduced between the parts of each pocket. These pockets or receptacles are made, preferably, of very thin sheet-steel, high in carbon, so as to be highly elastic, and are carefully nickel-plated, so as to be unaffected by the solution. The perforations therein are formed, as I describe in my application last referred to, by passing the sheets between male and female die-rolls, by means of which the metal will be displaced at each opening to form an inwardly-projecting bur which projects into the active material to increase the conducting effect. Preferably the walls of the pockets or receptacles are corrugated horizontally, as I describe in my application filed May 17, 1901, Serial No. 60,661, so as to stiffen the perforated walls and permit thinner sheet metal to be employed than would be possible without such corrugations.

Carried within the pockets or receptacles 7 is a suitable depolarizing material which is preferably mixed with a flake-like inert conducting material, such as flake graphite, in order to improve the conductivity of the cell. This depolarizing material is either a hydrated oxid of nickel or of cobalt, preferably the former, for reasons explained. When nickel is used, I preferably obtain the hydrate in non-colloidal form (as I describe in my application filed May 9, 1901, Serial No. 59,512) by adding to a boiling solution of nitrate of nickel a sufficient quantity of magnesium hydroxid to precipitate the whole of the nickel as nickel hydroxid—i. e., $Ni(OH)_2$—the whole being then thrown into water, in which it settles almost immediately. By decanting the water and adding fresh water six or eight times and decanting after each addition the hydroxid is obtained very free from impurities. Afterward the excess of water is filtered off and the hydroxid is then dried. If desired, the green hydroxid so obtained may be further oxidized to the peroxid state, to reduce the tendency to increase in bulk in use, by passing chlorin gas through a receptacle filled with the dried hydroxid, the action of the chlorin on the hydrate being to oxidize the latter, producing hydrochloric acid, which combines with a portion of the hydroxid and forms chlorid of nickel, which is washed out by percolation and used again to give fresh hydrate. Finally the hydrated peroxid is dried and is ready for use. The dried hydrated peroxid or the dried green hydroxid is then mixed with flake graphite or other flake-like inert conducting material in the proportion of six parts of the peroxid or hydroxid to four parts of the graphite. The mixture is then slightly moistened with water or a solution of potassic hydroxid and spread out on a glass plate and by means of a glass or porcelain roller pressed into a thin sheet. By means of a spatula the sheet is detached from the glass and broken up and rolled again. This operation is repeated a number of times, until the finely-divided oxid covers nearly the whole surface of the graphite particles. The mass is then molded into blocks, which are received between the two sections of each pocket or receptacle 7, after which the assembled sections are inserted within the openings 5 of the plates 4 and by the application of pressure secured in position therein.

If instead of a hydrated oxid of metal the corresponding oxid of cobalt is employed as a depolarizer, I may proceed as I describe in my application filed March 1, 1901, Serial No. 49,452, by first precipitating the monoxid or black hydrated dioxid of cobalt in the usual way, washing the precipitate free from the products of the reaction, filtering off the liquid, and drying the precipitate. The resulting dried hydrated oxid is then powdered very fine and is mixed with flake graphite or other inert flake-like conducting material in the proportion of about seven parts, by weight, of the powdered hydrate and three parts, by weight, of the flake graphite, the mass being moistened with a small quantity of a strong solution of potassic hydroxid and molded into blocks, which are received within the perforated pockets or receptacles 7.

When my improved cell is in a neutral or fully-discharged condition, the zinc will be in solution in the electrolyte and the hydrated oxid of nickel or cobalt will be reduced to a low condition of oxidation. In charging the zinc will be plated out of the solution onto the magnesium electrodes, while the hydrated oxid of nickel or cobalt will be raised to a superperoxid condition, in the case of oxid of nickel the condition of oxidation being higher than $Ni_2O_3$, and in the case of oxid of cobalt the condition of oxidation being higher than $Co_2O_3$. In discharging, obviously, the reverse operation takes place, the nickel or cobalt oxid reverting to a lower condition of oxidation and the zinc being oxidized and dissolved in the solution. In charging the operation is continued until about seventy-five per cent. of the zinc in the solution has been deposited on the magnesium supports. In discharging it will be found that a point is reached where the voltage falls considerably, due to the approach to exhaustion of the oxygen in the depolarizing material, and the discharge should not be permitted to take place materially beyond that point.

As shown, the positive and negative elements are properly connected and are supported in a suitable inclosing jar 8, hermetically sealed from the air, said jar being provided with a vent 9 for the escape of any gas generated therein.

I do not claim herein the new depolarizer per se, since claims thereon, expressed in language of varying breadth, are made in my application of even date, Edison No. 1,081.

By the expression "oxid of a magnetic metal other than iron" as used by me in my claims I mean the oxid of nickel or of cobalt or a mixture of such oxids.

Having now described my invention, what I claim as new, and desire to secure by Letters Patent, is as follows:

1. In a reversible galvanic battery, the combination of an alkaline solution, an electrode-support of metallic magnesium, a metal in solution capable of being electrodeposited upon the magnesium to constitute the oxidizable electrode on discharge, a second electrode-support, and an electrolytically-active oxid of a magnetic metal other than iron carried by the latter support, substantially as set forth.

2. In a reversible galvanic battery, the combination of an alkaline solution, an electrode-support of metallic magnesium, a metal in solution capable of being electrodeposited upon the magnesium to constitute the oxidizable electrode on discharge, a second electrode-support having perforated pockets or receptacles, and an electrolytically-active oxid of a magnetic metal other than iron carried within said receptacles, substantially as set forth.

3. In a reversible galvanic battery, the combination of an alkaline solution, an electrode-support of metallic magnesium, a metal in solution capable of being electrodeposited upon the magnesium to constitute the oxidizable electrode on discharge, a second electrode-support having perforated pockets or receptacles and presenting nickeled surfaces, and an electrolytically-active oxid of a magnetic metal other than iron carried within said receptacles, substantially as set forth.

4. In a reversible galvanic battery, the combination of an alkaline solution, an electrode-support of metallic magnesium, a metal in solution capable of being electrodeposited upon the magnesium to constitute the oxidizable electrode on discharge, a second electrode-support having perforated pockets or receptacles, and a mixture of electrolytically-active oxid of a magnetic metal other than iron and a flake-like, inert, conducting material carried within said pockets or receptacles, substantially as set forth.

5. In a reversible galvanic battery, the combination of an alkaline solution, an electrode-support of metallic magnesium, a metal in solution capable of being electrodeposited upon the magnesium to constitute the oxidizable electrode on discharge, a second electrode-support having perforated pockets or receptacles, and a mixture of electrolytically-active oxid of a magnetic metal other than iron and flake graphite carried within said pockets or receptacles, substantially as set forth.

6. In a reversible galvanic battery, an alkaline solution, a flat numerously-perforated electrode-support of metallic magnesium, a metal in solution capable of being electrodeposited upon the magnesium to constitute the oxidizable electrode on discharge, a second electrode-support, and an electrolytically-active oxid of a magnetic metal other than iron carried by the negative electrode-support, substantially as set forth.

7. In a reversible galvanic battery, an alkaline zincate electrolyte, a magnesium support for receiving the deposit of zinc, a second electrode-support, and an electrolytically-active oxid of a magnetic metal other than iron carried by the latter support, substantially as set forth.

8. In a reversible galvanic battery, an alkaline zincate electrolyte, a magnesium support for receiving the deposit of zinc, a second electrode-support having perforated pockets or receptacles, and an electrolytically-active oxid of a magnetic metal other than iron carried within said pockets or receptacles, substantially as set forth.

9. In a reversible galvanic battery, an alkaline zincate electrolyte, a magnesium support for receiving the deposit of zinc, an electrode-support having perforated pockets or receptacles, and a mixture of electrolytically-active oxid of a magnetic metal other than iron and a flake-like, inert, conducting material carried within said pockets or receptacles, substantially as set forth.

10. In a reversible galvanic battery, an alkaline zincate electrolyte, a magnesium support for receiving the deposit of zinc, a second electrode-support having perforated pockets or receptacles, and a mixture of electrolytically-active oxid of a magnetic metal other than iron and flake graphite carried within said pockets or receptacles, substantially as set forth.

This specification signed and witnessed this 17th day of June, 1901.

THOMAS A. EDISON.

Witnesses:
FRANK L. DYER,
RICHD. N. DYER.